July 25, 1961 W. L. PAILTHORP ET AL 2,993,379
FAST ACTION THERMOSTAT
Filed July 2, 1958

2,993,379
FAST ACTION THERMOSTAT

Walter L. Pailthorp, Milford, William J. Waller, Stratford, and David L. Morgan, Shelton, Conn., assignors to Robertshaw-Fulton Controls Company, Richmond, Va., a corporation of Delaware
Filed July 2, 1958, Ser. No. 746,232
7 Claims. (Cl. 73—368)

This invention relates to a temperature responsive device and more particularly, to a fast acting temperature responsive device.

It has been long known that when a thermostat embodying an expansible element operated by pressure changes of a volatile charge is used for measuring any increase or decrease in temperature, that the rapidity of response during a decrease in temperature, or when the element is cooling, is much greater than during an increase in temperature. This is due primarily to the differences in thermal conductivity between vapor condensing on the walls during cooling and gas bubbles forming on the walls during heating.

It is an object of this invention to produce rapid responses in a thermostat due to sudden changes in temperature.

It is a further object of this invention to effect a rapid responsive movement of a portion of a temperature sensor in response to a sudden change in temperature.

Another object of this invention is to utilize entrapped fluid to agitate an enclosed liquid and increase the rate of heat transfer in a temperature sensing element.

Another object is to increase the rapidity of response in a fluid actuated sensing element when the element is being operated in a temperature range wherein a portion of the enclosed fluid is in a liquid state.

Briefly stated, in accordance with one aspect of this invention, a pressure operated expansible element communicates with a temperature sensing element filled with a charge of volatile fluid. The temperature sensing portion is so formed that a portion of the vapor, evaporating from the volatile fluid upon an increase in heat content thereof, collects and agitates the remaining liquid to increase the rate of heat transfer to the liquid.

Other objects and advantages of this invention will be apparent from the following specification taken in conjunction with the accompanying drawings wherein.

Figure 1:
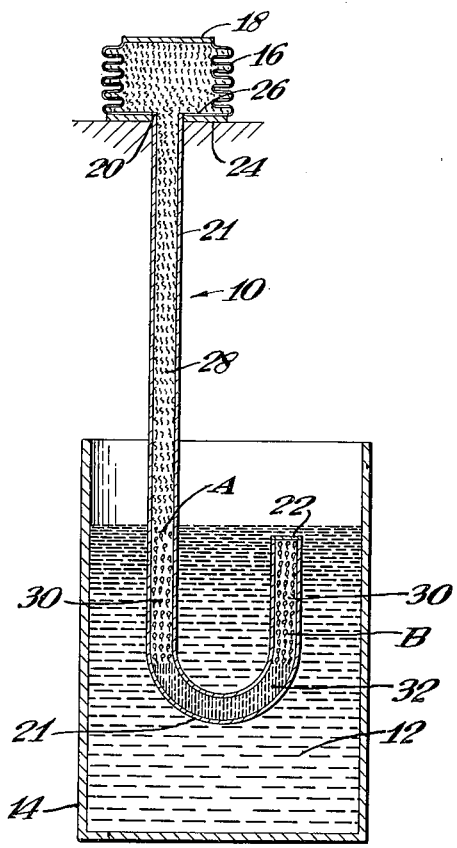
FIG. 1 is a longitudinal cross-section of one embodiment of this invention.

In FIG. 1, fast action thermostat 10 is inserted into bath 12 in tank 14. Expansible pressure operated element 16, more commonly referred to as a bellows unit, is formed with top 18 and bottom wall 26 having one end of tube 21 joined thereto at 20. Tube 21 extends in a downward direction and is formed with a U-shaped bend. The other end of tube 21 is sealed with cap 22.

A charge of volatile fluid is sealed within tube 21 and expansible element 16 and has a liquid state indicated at 32, a saturated vapor state indicated at 30, and a superheated vapor state indicated at 28. As is well known, the amount and proportions of the various states of a fixed charge is directly proportional to the temperature thereof. Hence for a given charge at a certain temperature, a definite pressure exists which will cause expansible element 16 to assume a certain position. The temperature at which the volatile fluid exists is indicated by the distance between a portion of expansible element 16 and a stationary area, which as shown in FIG. 1, could be the distance between top 18 and stationary support 24. Chamber A represents the area above liquid 32 which has an expansible volume due to expansible element 16, whereas chamber B represents an area above liquid 32 which has an unexpansible end portion.

In operation, tube 21 is inserted into bath 12 which is at a lower temperature than the confined volatile fluid, and vapor condenses on the walls of tube 21 and runs downwardly to collect in the lower portions thereof. This action continues until the temperature of the enclosed fluid reaches that of bath 12, at which time top 18 will be a distance from stationary support 24 corresponding to the temperature of the bath.

If, however, tube 21 is inserted into a higher temperature bath 12, the action is somewhat different. Some of the vapor evaporating from the liquid state 32 in the bottom of the bend collects in chamber A and some of the vapor collects in chamber B. The increasing pressure caused by vapor collecting in chamber A causes expansible element 16 to expand; however, the vapor collecting in chamber B is not able to expand upwardly. Consequently, liquid 32 in the bend will be forced around the bottom thereof until some of the vapor in chamber B escapes around the bend into chamber A.

Upon vapor escaping, the liquid returns and prevents vapor collecting in chamber B from passing to chamber A. This cycle continues to repeat itself and consequently, until equilibrium is reached, the liquid washes back and forth through the bottom of the bend. This washing back and forth, or agitation, wipes and scrubs away vapor bubbles collecting on the walls of the tube adjacent liquid 32 and thereby increases the rate of heat transfer through the walls. This wiping back and forth continues until such time as the tube reaches equilibrium with the temperature of the bath or until such time as there remains so little amount of liquid that chamber B communicates directly with chamber A. This occurs when the liquid level is below the upper walls of the bend in tube 21. It is preferable though that sufficient charge be sealed within the device so that this will not occur in the expected normal operating range.

Figure 2:
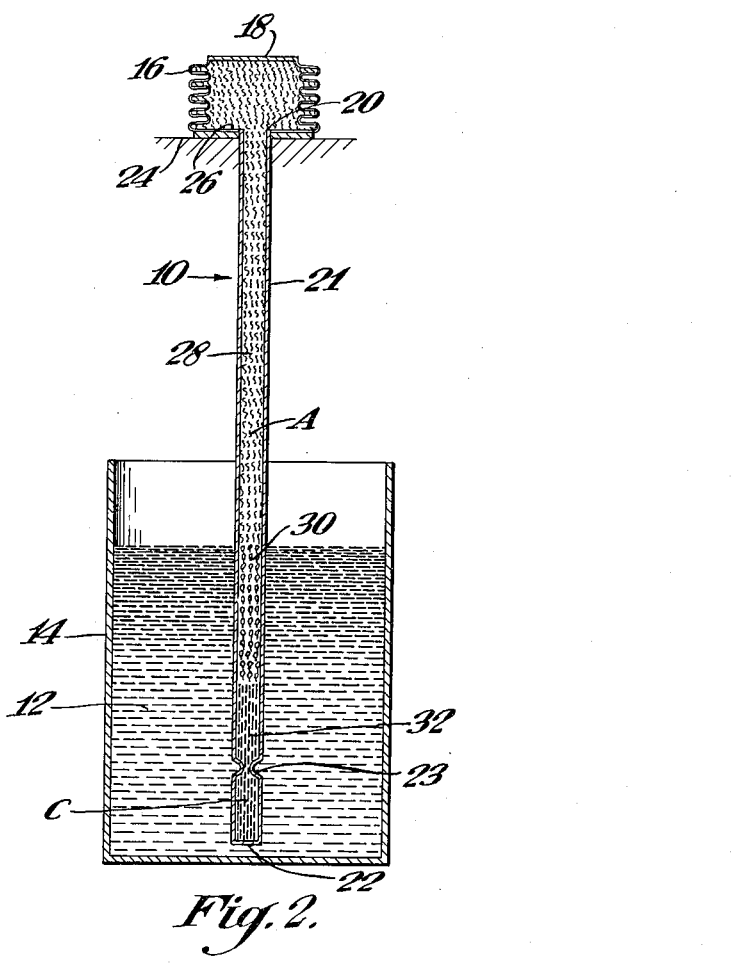
FIG. 2 is a cross-section of another embodiment of this invention.

In FIG. 2, fast action thermostat 10 has an expansible element 16 formed with a top 18 and bottom 26 connected to and communicating with tube 21 at aperture 20. Tube 21 is sealed by cap 22 and has an annular restriction 23 formed near the bottom of the tube. This restriction forms chamber A, similar in function to chamber A in the embodiment shown in FIG. 1, above the restriction 23 and forms chamber C beneath the restriction. Sufficient charge of volatile fluid is placed within the sealed fast action thermostat 10 to insure that the liquid lever 32 is above restriction 23 in the desired operating range.

During cooling, vapor condenses on the walls of tube 21 and flows by gravity to collect in the bottom of tube 21. During an increase in temperature, however, vapor evaporates from the liquid above restriction 23 and passes directly to chamber A. Vapor evaporating from the liquid contained in chamber C causes agitation of liquid above restriction 23 by two different actions. Initially, the collecting of vapor beneath restriction 23 will result in some of the liquid being displaced through the opening formed by restriction 23 into the area above. The vapor collected then expands. This expansion will cause a consequent decrease in temperature of the collected vapor with the resultant contraction thereof allowing some of the liquid previously forced through the opening to return to chamber C.

The second mode of action is that upon a sufficient quantity of vapor being collected in chamber C, restriction 23 will act in the manner of a nozzle forcing a steady stream of rising vapor bubbles to pass through the liquid in the area above restriction 23 to chamber A. In both cases, the liquid contained in tube 21 above restriction 23 is agitated, either by liquid passing through the opening or by the steady stream of bubbles rising upwardly. This movement consequently agitates the liquid and scrubs and wipes the walls removing vapor bubbles collecting thereon and thereby increases the rate of heat transfer.

It is understood that changes may be made in the combination and arrangement of parts and in the details of construction within the scope of the appended claims without departing from the invention disclosed herein.

We claim:

1. A temperature responsive element comprising an expansible element having a hollow interior and an apertured end portion; a tube having one end thereof sealed and the other end joined to the apertured end portion of said expansible element whereby the interior of the tube communicates with the interior of said expansible element, said tube extending downwardly from said expansible element and having the lower portion thereof reversely curved; and a charge of volatile fluid including a liquid portion and first and second vapor portions enclosed within the tube, said liquid portion of said volatile fluid positioned in a chamber formed by said lower curved portion of said tube, said first vapor portion of said volatile charge being confined within a chamber formed by said reversely curved portion adjacent said sealed end of said tube and said second vapor portion of said volatile charge being contained within a chamber portion communicating with said hollow interior of said expansible portion, said first vapor portion being entrapped within said chamber formed by said reversely curved portion of said tube and which upon heating causes agitation of said fluid in said liquid state whereby a wiping action of said liquid on the tubing walls is effected.

2. A temperature responsive element comprising a pressure operated expansible element; a tube connected to said element in a fluid-tight seal whereby the interior of said tube communicates with said expansible element; a volatile fluid sealed within the interior of said tube; and a restricted section formed by partially constricting the tube to form a passage and restriction whereby saturated vapor collects beneath said restriction when said tube is charged with said volatile fluid and is heated and subsequently agitates any liquid above said restriction by expansion of said collected vapor, a sufficient charge of said volatile fluid being placed within the said tube to insure that the liquid level is above said restriction in the tube.

3. In a thermostat, a temperature sensitive device comprising: an expansible element having a hollow interior whereby a portion of said element moves in response to pressure variations within said interior; a hollow tube sealed at one end and having the other end thereof connected to said expansible element whereby the interior of said tube communicates with said hollow interior of said expansible element; a charge of volatile fluid having a liquid portion and a vapor portion disposed within said interiors adapted to create a pressure within said interiors dependent upon the temperature of said fluid; a chamber adjacent said sealed end of said tube for collecting vapor evaporating from said liquid portion, said liquid portion of said fluid positioned between said chamber and said expansible element, said chamber positioned to direct a portion of said collected vapor to agitate said liquid whenever the quantity of said collected vapor increases above a predetermined amount.

4. In a temperature responsive device having a charge of volatile liquid filled within a temperature sensing element, and an expansible element communicating with said temperature sensing element adapted to cause movement of a portion of said expansible element in response to pressure variations of said volatile liquid caused by changes in temperature, the improvement comprising: chamber means adjacent one end of said temperature sensing element for collecting a portion of the vapor formed by evaporation of said volatile liquid, upon an increase in temperature, and directing said collected vapor through said volatile liquid.

5. The device in claim 4 in which said chamber means comprises a portion of said temperature sensing element reversely curved said curved portion being filled with liquid to separate said sensing element into a plurality of chambers.

6. The device in claim 4 in which said chamber means comprises a constriction in the temperature sensing element adapted to cause the accumulation of collected vapor beneath said constriction.

7. The device of claim 2 in which said restricted section forms a nozzle for directing a steady stream of rising vapor bubbles to pass through said liquid in the area above said restricted section to agitate said liquid.

References Cited in the file of this patent

UNITED STATES PATENTS

| | | |
|---|---|---|
| 1,916,814 | Shivers | July 4, 1933 |
| 1,990,219 | Baird | Feb. 5, 1935 |